(12) United States Patent
Mizutani (10) Patent No.: US 9,921,304 B2
(45) Date of Patent: Mar. 20, 2018

(54) OBJECT DETECTION APPARATUS

(71) Applicant: HONDA MOTOR CO., LTD., Minato-Ku, Tokyo (JP)

(72) Inventor: Katsuya Mizutani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 422 days.

(21) Appl. No.: 14/686,871

(22) Filed: Apr. 15, 2015

(65) Prior Publication Data

US 2015/0309168 A1    Oct. 29, 2015

(30) Foreign Application Priority Data

Apr. 25, 2014  (JP) .................. 2014-091994

(51) Int. Cl.
| | | |
|---|---|---|
| G01S 13/04 | (2006.01) | |
| G01S 13/86 | (2006.01) | |
| G01S 13/93 | (2006.01) | |
| G01S 13/00 | (2006.01) | |

(52) U.S. Cl.
CPC .......... G01S 13/04 (2013.01); G01S 13/867 (2013.01); G01S 13/931 (2013.01); *G01S 2013/9353* (2013.01); *G01S 2013/9375* (2013.01)

(58) Field of Classification Search
CPC ...... G01S 13/04; G01S 13/931; G01S 13/867; G01S 2013/9375; G01S 2013/9353; G01S 7/51; B60Q 9/008
See application file for complete search history.

(56) References Cited

U.S. PATENT DOCUMENTS

| | | | | |
|---|---|---|---|---|
| 5,689,264 A | * | 11/1997 | Ishikawa et al. | ......... G01S 7/51 |
| 59,363,549 | * | 8/1999 | Tsuchiya | ............... G01S 13/931 |
| 6,002,983 A | * | 12/1999 | Alland et al. | ......... G01S 13/931 |

(Continued)

FOREIGN PATENT DOCUMENTS

| | | |
|---|---|---|
| DE | 196 00 059 A1 | 7/1997 |
| DE | 10 2010 003 375 A1 | 9/2011 |

(Continued)

OTHER PUBLICATIONS

Machine Translation of JP2004347471(A), Dec. 9, 2004, Kaji Takashige.*

(Continued)

*Primary Examiner* — Bernarr E Gregory
(74) *Attorney, Agent, or Firm* — Carrier Blackman & Associates, P.C.; William D. Blackman; Jingii Wang (57) ABSTRACT

In an apparatus for detecting and determining identicality of at least one object present within a region around a subject vehicle to be monitored, having a first detector adapted to detect the at least one object, a second detector adapted to detect the at least one object, and an identicality determiner adapted to determine whether the at least one object detected by the first and second detectors are identical, it is configured that the identicality determiner determines that, when the first detector detects the objects in a plural number in a first direction and the second detector detects the object in a single number in a second direction that is same as the first direction, one among the objects ahead and nearest to the subject vehicle detected by the first detector and the object detected by the second detector are identical.

20 Claims, 3 Drawing Sheets

(56) References Cited

U.S. PATENT DOCUMENTS

| | | | |
|---|---|---|---|
| 6,061,015 A * | 5/2000 | Sugimoto | G01S 13/931 |
| 6,239,738 B1 | 5/2001 | Wanielik et al. | |
| 7,453,374 B2 * | 11/2008 | Koike et al. | B60Q 9/008 |
| 2007/0265777 A1 * | 11/2007 | Munakata | G01S 13/931 |
| 2009/0122136 A1 | 5/2009 | Shiraishi et al. | |
| 2009/0135065 A1 | 5/2009 | Tsuchida et al. | |

FOREIGN PATENT DOCUMENTS

| | | |
|---|---|---|
| JP | 2002-341021 A | 11/2002 |
| JP | 2004-347471 A | 12/2004 |
| JP | 2007-024590 A | 2/2007 |
| JP | 2012-064026 A | 3/2012 |

OTHER PUBLICATIONS

Office Action dated Feb. 14, 2017 in the corresponding Japanese Patent Application 2014-091994 with the English translation thereof.

Office Action issued on dated Dec. 12, 2016 in the corresponding German Patent Application 10 2015 207 206.1 with the English translation thereof.

* cited by examiner

OBJECT DETECTION APPARATUS

BACKGROUND

Technical Field

An embodiment of this invention relates to an object detection apparatuses, more specifically to an apparatus equipped with multiple object detectors or means, which determines identicality among objects detected by the respective detectors.

Related Art

Devices have been known for some time that are equipped with multiple object detectors and determine identicality among objects detected by the respective detectors. For example, Patent Document 1 (Japanese Laid-Open Patent Application No. 2004-347471) teaches use of image data from a camera and radar data from a laser radar or the like to determine whether an object detected by the camera and an object detected by the radar are the same.

According to the teaching of Patent Document 1, an object detected by the camera and an object detected by the radar are determined to be the same object when the positon (distance) or velocity of the object detected by the camera and the positon (distance) or velocity of the object detected by the radar are the same.

SUMMARY

However, when, as in the teaching of Patent Document 1, objects are detected using multiple object detectors, it is conceivable, for example, that a first detector detects multiple objects in a given direction (for example, a subject vehicle traveling direction), while another detector detects only a single object, so that situations may arise in which the detected objects differ between the two detectors.

When objects are present successively in the subject vehicle traveling direction, at least the object nearest the subject vehicle (nearest object ahead) must be detected without fail. However, when multiple detectors are used, accurate determination of identicality between objects detected by the respective detectors may be impossible because, for example, an object detected by another detector may be falsely determined to be the same as an object other than the nearest object ahead detected by the first detector.

Therefore, an embodiment of this invention is directed to overcoming the aforesaid problem by providing an object detection apparatus equipped with multiple object detectors, which object detection apparatus is configured to enable accurate determination of detected object identicality even in a case where objects detected by one detector and objects detected by another detector differ in number.

In order to achieve the object, the embodiment of this invention provides, in a first aspect, an apparatus for detecting and determining identicality of at least one object present within a region around a subject vehicle to be monitored, comprising: a first detector adapted to detect the at least one object; a second detector adapted to detect the at least one object; and an identicality determiner adapted to determine whether the at least one object detected by the first and second detectors are identical, wherein the identicality determiner determines that, when the first detector detects the objects in a plural number in a first direction and the second detector detects the object in a single number in a second direction that is same as the first direction, one among the objects ahead and nearest to the subject vehicle detected by the first detector and the object detected by the second detector are identical.

In order to achieve the object, the embodiment of this invention provides, in a second aspect, a method for detecting and determining identicality of at least one object present within a region around a subject vehicle to be monitored having a first detector adapted to detect the at least one object, a second detector adapted to detect the at least one object, and an identicality determiner adapted to determine whether the at least one object detected by the first and second detectors are identical, comprising the step of: determining that, when the first detector detects the objects in a plural number in a first direction and the second detector detects the object in a single number in a second direction that is same as the first direction, one among the objects ahead and nearest to the subject vehicle detected by the first detector and the object detected by the second detector are identical.

BRIEF DESCRIPTION OF THE DRAWINGS

The above and other objects and advantages of an embodiment of this invention will be more apparent from the following description and drawings in which.

DESCRIPTION OF EMBODIMENT

An embodiment of an object detection apparatus according to this invention is explained with reference to the attached drawings in the following.

Figure 1:
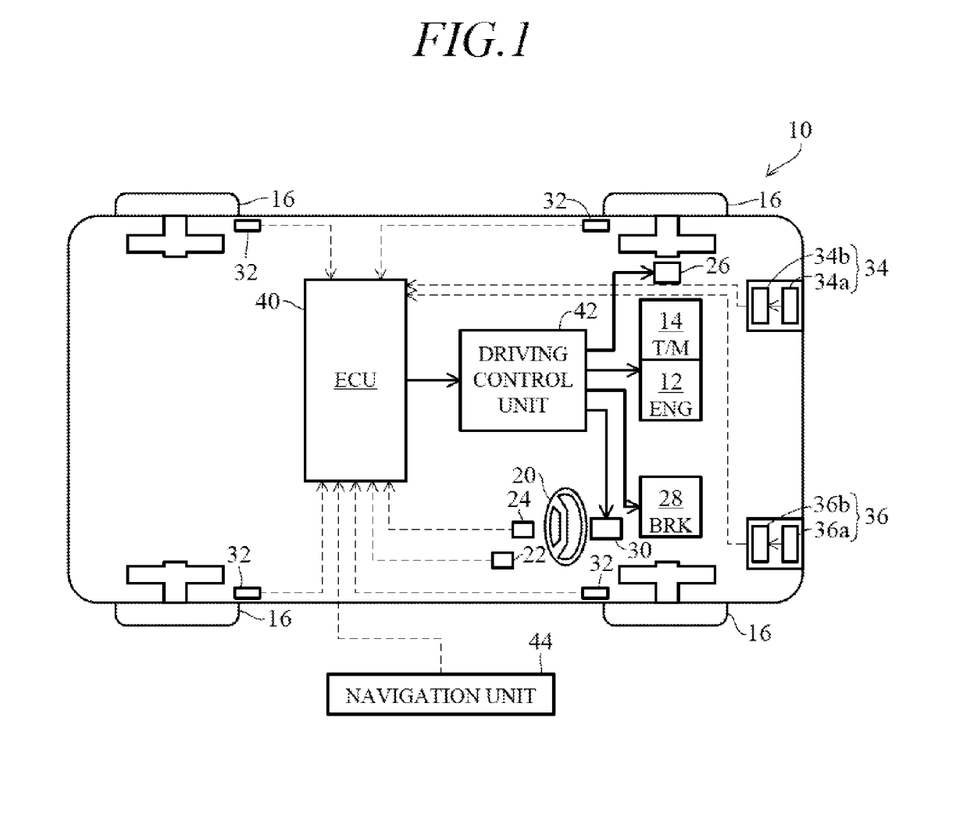
FIG. 1 is an overall schematic view of an object detection apparatus according to an embodiment of this invention.

FIG. 1 is an overall schematic view of an object detection apparatus according to the embodiment of this invention.

Reference numeral 10 in FIG. 1 designates a vehicle (subject vehicle) having an engine (internal combustion engine; designated ENG in FIG. 1) 12 installed at the front and being adapted to travel on a road. The speed and output of the engine 12 are regulated by a transmission (designated T/M in FIG. 1) 14 and transmitted to wheels 16 to drive the subject vehicle 10.

A steering angle sensor 22 installed near a steering wheel 20 provided at the driver's seat of the subject vehicle 10 outputs a signal proportional to a steering angle inputted through the steering wheel 20, and a torque sensor 24 is installed that outputs a signal proportional to the direction and magnitude of a steering force (steering torque) inputted through the steering wheel 20.

An electric motor 26 for steering assistance is installed near the front wheels to assist driver steering. Specifically, a mechanism that converts rotation of a steering wheel transmitted from a steering shaft and the like to reciprocating motion of a rack through a pinion (not shown) to steer the front wheels via tie rods (not shown) is provided on the rack with the electric motor 26.

The vehicle 10 is equipped with a brake hydraulic mechanism (designated BRK in FIG. 1) 28 that applies braking force (deceleration force) to the wheels 16 in proportion to driver braking operation inputted through a brake pedal (not shown) installed on the floor at the driver's seat of the vehicle 10. A warning device 30 comprising an audio speaker, an indicator and the like is installed at the driver's seat of the subject vehicle 10 for warning the driver audibly and visually.

A vehicle speed sensor 32 installed near each wheel 16 outputs a pulse signal once every predetermined rotation angle of the wheel, in proportion to the speed V of the subject vehicle 10.

The front or other suitable part of the vehicle 10 is equipped with a radar unit (first detector) 34. The radar unit 34 emits a millimeter-wave beam or other electromagnetic beam in the traveling direction of the vehicle 10 from a radar 34a installed, for example, on a nose at the front of the body of the vehicle 10 and receives/processes a reflected wave from any object (vehicle ahead or other obstacle) present in the traveling direction when the vehicle 10 travels on the road, thereby detecting the object(s).

The reflected wave received from the object is sent to a radar output processing unit 34b comprising a microcomputer. The radar output processing unit 34b calculates the relative distance to the other vehicle(s) by measuring the time from the emission of the laser beam to the receipt or return of the reflected laser beam and further differentiates the relative distance to determine the velocity relative to the object(s). Moreover, the direction of each object is detected from the incidence direction of the reflected beam, thereby obtaining position, velocity and other data on the object.

The subject vehicle 10 is further equipped with an imaging unit (second detector) 36. The imaging unit 36 comprises a camera 36a comprising a CCD camera or C-MOS camera (a monocular camera; imaging device) and an image processor 36b. The camera 36a is installed to take images at least in the forward direction of the subject vehicle 10. The image processor 36b subjects the images taken by the camera 36a to known image processing, such as filtering and binarization, to generate image data and, and as with the radar unit, thereby obtaining position/speed and other data on any object present in the traveling direction of the subject vehicle 10.

The data on the object(s) obtained by the radar unit 34 and the imaging unit 36 are sent to an ECU (electronic control unit; object detection apparatus) 40. The outputs of the aforesaid sensors (steering angle sensor 22, torque sensor 24 and vehicle speed sensors 32) are also sent to the ECU 40. Although not illustrated, the ECU 40 is configured as a microcomputer comprising, inter alia, a CPU, RAM, ROM and I/O circuit.

The ECU 40 determines the identicality (also referred to as identity) of an object detected by the radar unit 34 and an object detected by the imaging unit 36. More specifically, objects detected by the two detectors are determined to be the same object when the distance between the object nearest the subject vehicle 10 (nearest object ahead) among the objects detected by the radar unit 34 and the object detected by the imaging unit 36 is equal to or smaller than a distance (predetermined distance; explained later) that can be deemed to fall within design-induced error margins of the respective detectors (radar unit 34 and imaging unit 36).

A driving control unit 42 is responsive to signals received from the ECU 40 for assisting the driver to steer the steering wheel 20 (steering assistance control), performing collision avoidance assistance control for avoiding collision with an object recognized by the radar unit 34 and imaging unit 36, performing vehicle-following control, and implementing other such known driving assistance control. The aforesaid collision avoidance assistance control involves control of steering by the steering wheel 20 and operational control of the engine 12 and transmission 14, but if desired can of course further include other types of control such as braking control via the brake hydraulic mechanism 28 and accelerator control.

Further, a navigation unit 44 is mounted in the subject vehicle 10. As a result, the ECU 40 can acquire position and velocity data on objects present in the traveling direction of the subject vehicle 10 utilizing data obtained from the navigation unit 44 in addition to data from the radar unit 34 and imaging unit 36, although this aspect is not discussed in the explanation that follows.

Although the object detector for detecting objects present in the vicinity (monitored region) of the subject vehicle 10 are not limited to the foregoing examples, no further details will be explained here, other than to point out that it is also possible to use data obtained regarding, for example, pedestrians and infrastructural features on the road being traveled by the vehicle 10.

Figure 2:
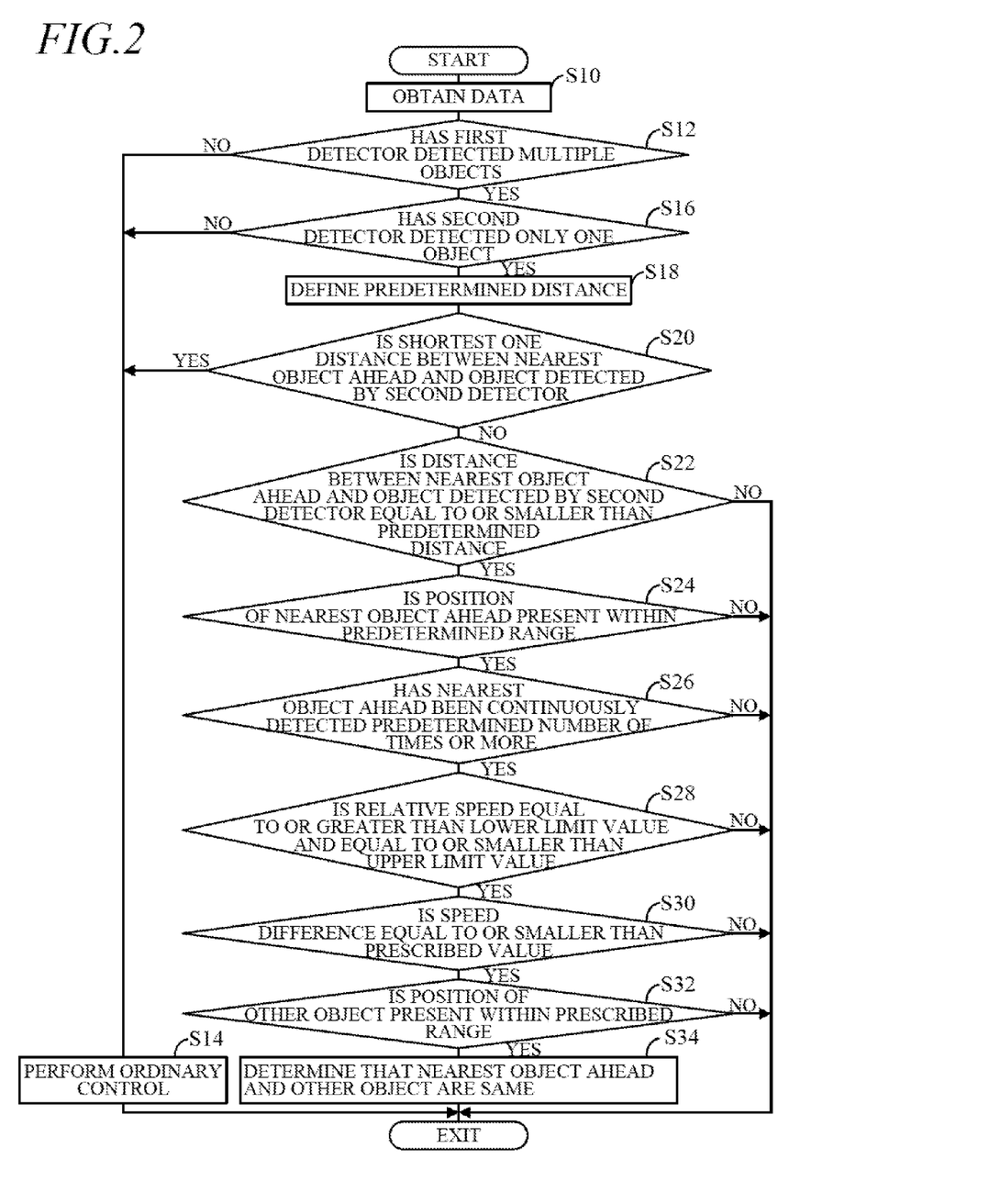
FIG. 2 is a flowchart showing identicality determination processing by the object detection apparatus shown in FIG. 1.
Figure 3:
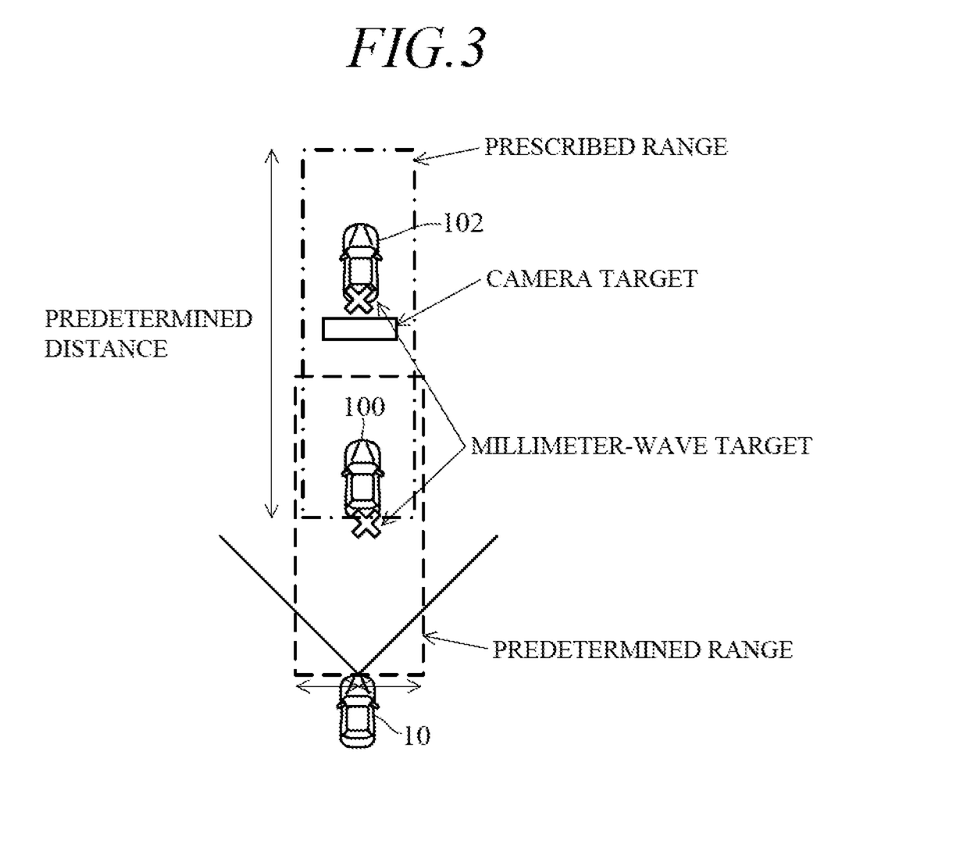
FIG. 3 is a diagram for explaining the identicality determination processing by the object detection apparatus shown in FIG. 1.

FIG. 2 is a flowchart showing identicality determination processing performed by the ECU 40, and FIG. 3 is a diagram for explaining the identicality determination processing. The program illustrated in FIG. 2 is executed by the ECU 40 at predetermined intervals.

Now to explain, the program begins at S10, in which the ECU 40 obtains (samples) data acquired by the radar unit 34 and imaging unit 36. In FIG. 2, the symbol S indicates a processing Step performed by the ECU 40.

Next, in S12, it is determined whether the radar unit (first detector) 34 has detected multiple objects (preceding vehicles etc.) in the traveling direction of the subject vehicle 10. More exactly, it is determined whether multiple objects arrayed as if in a column have been detected in the traveling direction of the subject vehicle 10 (direction of the beam radiated by the radar 34a).

Specifically, when the radar unit 34 is used to detect objects, those other than the nearest object are not usually detected insofar as the objects are arrayed in a column in the direction of the millimeter-wave beam radiated by the radar 34a (i.e., the nearest object ahead hides and prevents detection of background objects). However, when the electromagnetic beam from the radar 34a passes through a gap not blocked by the nearest object ahead (for example, a gap or vacancy between a vehicle that is the nearest object ahead and the road surface), an object present farther ahead of the nearest object ahead may be detected. Another possibility is that the nearest object ahead and an object present farther ahead are offset in the lateral direction. In such cases, when determining identicality of the multiple objects detected by the radar unit 34 and an object detected by another detector, a danger of false determination arises if the other detector does not detect the nearest object ahead and detects only an object present ahead of the nearest object ahead.

This embodiment is configured taking this problem into account. Therefore, when the result in S12 is negative, i.e., when only a single object is detected so that there is no danger of the aforesaid problem arising, the program proceeds to S14, in which identicality of the objects is determined based on ordinary (conventional) control.

In this specification, the term "monitored region (region to be monitored)" refers to the region surrounding the subject vehicle 10 when it travels on the road, by which is meant the overall region in which objects can be detected using the radar unit 34 and imaging unit 36, and in addition, infrastructural features and the like. Further, the "traveling direction (same direction) of the subject vehicle 10" does not refer to only a straight line direction from the subject vehicle 10 but means directions spreading radially from the subject vehicle 10 at the center, where the angular range of the radiating directions is determined by the settings of the radar unit 34 and imaging unit 36.

On the other hand, when the result in S12 is affirmative, the program proceeds to S16, in which, by the ECU 40, it is determined whether the imaging unit (second detector) 36 has detected only one object, or whether the number of objects detected by the radar unit 34 and the number of objects detected by the imaging unit 36 are different. When the result in S16 is negative, i.e., when the radar unit 34 and the imaging unit 36 are found to have detected the same number of objects so that there is again no danger of the aforesaid problem arising, the program proceeds to S14, in which ordinary control is performed. To the contrary, when the result in S16 is affirmative, the program proceeds to S18.

In S18, the ECU 40 appropriately defines a predetermined distance to be used as a criterion for determining whether an object detected by the radar unit 34 and an object detected by the imaging unit 36 are the same object.

Specifically, the predetermined distance is defined as a greater value in proportion as the distance from the subject vehicle 10 to the object nearest the subject vehicle 10 among the multiple objects detected by the radar unit 34, i.e., the nearest object ahead, is greater.

Moreover, the predetermined distance is defined as a greater value in proportion as the distance from the subject vehicle 10 to the object detected by the imaging unit 36 is greater.

This is because when an object far from the subject vehicle is detected using different detectors (for example, the radar unit 34 and the imaging unit 36), false detection tends to occur more readily because of difference in detection accuracy. In such a case, the predetermined distance is therefore set to a value greater than the initial value. In other words, the allowable range of false detection is expanded.

On the other hand, when an object near the subject vehicle is detected using different detectors (for example, the radar unit 34 and the imaging unit 36), false detection of the object is unlikely to occur and identicality of the objects detected by the two detectors can be accurately determined. In such a case, the predetermined distance is therefore set to a value smaller than the initial value. In other words, the allowable range of false detection is narrowed down.

It is well known that when an object is discerned using a millimeter-wave beam like that emitted from the radar 34a of the radar unit 34, recognition accuracy is relatively high with respect to the direction of millimeter-wave beam transmission (traveling direction of the subject vehicle 10). However, when an object is discerned using a camera (particularly a monocular camera) like the camera 36a of the imaging unit 36, recognition accuracy with respect to the traveling direction of the subject vehicle 10 is not very high. Therefore, the problem of false detection with increasing distance of the object from the subject vehicle 10 is especially likely to be caused by the imaging unit 36. In this embodiment, however, the predetermined distance is varied in accordance with the distance between the subject vehicle 10 and the detected object, so that such false detection can be prevented and identicality of the object detected by the radar unit 34 and the object detected by the imaging unit 36 can be determined still more accurately.

The program next proceeds to S20, in which the distances between the object detected by the imaging unit 36 and the multiple objects detected by the radar unit 34 are calculated, and these are compared to determine whether the shortest one is the distance between the nearest object ahead of the subject vehicle 10 and the object detected by the imaging unit 36.

When the result in S20 is affirmative, it can be determined that the imaging unit 36 has accurately detected the nearest object ahead. That is, since there is no danger of the object detected by the imaging unit 36 being falsely determined (falsely detected) as being the same as an object other than the nearest object ahead, the program proceeds to S14, in which ordinary control is performed.

On the other hand, when the result in S20 is negative, that is, when it is determined that the position of the object detected by the imaging unit 36 is nearer to the position of an object other than the nearest object ahead detected by the radar unit 34 than it is to the position of said nearest object ahead, the program proceeds to S22, because by ordinary control the ECU 40 would falsely determine that the object detected by the imaging unit 36 is the same as an object other than the nearest object ahead.

In S22, it is determined whether the distance between the nearest object ahead detected by the radar unit 34 and the object detected by the imaging unit 36 is equal to or smaller than the predetermined distance defined in S18. When the result in S22 is negative, the object detected by the imaging unit 36 and the nearest object ahead detected by the radar unit 34 are determined to be different objects, so the ensuing processing steps are skipped, and the program is terminated.

On the other hand, when the result in S22 is affirmative, the program proceeds to S24, in which it is determined whether the object nearest the subject vehicle 10 (nearest object ahead) among the objects detected by the radar unit 34 is present within a predetermined range relative to the position of the subject vehicle 10. The predetermined range is a range of an order enabling the imaging unit 36 to discriminate the type of the nearest object ahead (vehicle, sign or whatever) substantially without fail.

Therefore, more exactly speaking, in S24, it is determined whether the nearest object ahead is present within the predetermined range and it is discriminated whether the nearest object ahead is a vehicle. When the result in S24 is negative, i.e., when the nearest object ahead is not present in the predetermined range, or when the type of the nearest object ahead cannot be discriminated or is determined not to be a vehicle, the ensuing processing steps are skipped, and the program is terminated. On the other hand, when the nearest object ahead is present in the predetermined range and is discriminated to be a vehicle, the result in S24 is affirmative and the program proceeds to S26.

In S26, it is determined whether the nearest object ahead detected by the radar unit 34 in the current cycle has been continuously detected a predetermined number of times or more. When the result in S26 is negative, indicating the possibility that the radar unit 34 has falsely detected the object concerned, the ensuing processing steps are skipped, and the program is terminated. On the other hand, when the result in S26 is affirmative, the program proceeds to S28.

In S28, the speed relative to the subject vehicle 10 of the nearest object ahead detected by the radar unit 34 (in the current cycle) is calculated and it is determined whether the calculated relative speed is equal to or greater than a lower limit value and equal to or smaller than an upper limit value (predetermined values), i.e., as to whether the relative speed difference between the nearest object ahead and the subject vehicle 10 is small. The upper limit value and lower limit value are defined based on the detection accuracy of the radar unit 34 as values found to enable stable object detection. To clarify, when it is found that the radar unit 34 also cannot stably detect a nearest object ahead or objects other than a nearest object ahead because the relative speed difference between the nearest object ahead and the subject vehicle 10 is great, a problem of there being no match between objects detected by the radar unit 34 and the imaging unit 36 is unlikely to arise. So also when the result in S28 is negative, the ensuing processing steps are skipped, and the program is terminated, thus reducing the processing load on the ECU 40.

When, to the contrary, the result in S28 is affirmative, i.e., when the speed of the nearest object ahead relative to the subject vehicle 10 is equal to or greater than the lower limit value and equal to or smaller than the upper limit value (predetermined values), so that the nearest object ahead is determined to be a preceding vehicle, traveling in the same direction as the subject vehicle 10, with which a collision may occur, the program proceeds to S30.

In S30, the speed difference between the nearest object ahead detected by the radar unit 34 in the current cycle and an object other than the nearest object ahead is calculated and it is determined whether the calculated speed difference is equal to or smaller than a prescribed value. When the calculated speed difference is equal to or smaller than the prescribed value, it is determined that the imaging unit 36 falsely detected the nearest object ahead and the object other than the nearest object ahead or that it detected the two objects bundled as if a single object, and the ensuing processing steps of the program are therefore executed. On the other hand, when the calculated speed difference exceeds the prescribed value, the object detected by the imaging unit 36 can be determined to be an object other than the nearest object ahead. In this case also, therefore, the ensuing processing steps are skipped, and the program is terminated, thus reducing the processing load on the ECU 40.

In S32, it is determined whether the position of an object other than the nearest object ahead (other object) is present within a prescribed range relative to the nearest object ahead. The prescribed range is defined based on the characteristics of the imaging unit 36 as a range within which an object detected by the imaging unit 36 might be falsely determined to be the same object as another object. Therefore, when the result in S32 is negative, i.e., when no detected other object is present within the prescribed range, the remaining processing step is skipped, and the program is terminated.

On the other hand, when the result in S32 is affirmative, the program proceeds to S34, in which it is determined that the nearest object ahead detected by the radar unit 34 and the object detected by the imaging unit 36 are the same, and the program is terminated.

The aforesaid embodiment is configured to carry out a determination in S22 whether the distance between the nearest object ahead detected by the radar unit 34 and the object detected by the imaging unit 36 is equal to or smaller than the predetermined distance and carry out a determination in S32 whether the position of the other object detected by the radar unit 34 is present within the prescribed range relative the nearest object ahead. However, the processing of S22 can be omitted. In such case, similarly to in the case of defining the predetermined distance in S22, the prescribed range in S32 is set to a larger value (wider range) in proportion as the distance from the subject vehicle 10 to the nearest object ahead or the distance from the subject vehicle 10 to the object detected by the radar unit 34 is greater.

An example of the aforesaid processing will be explained with reference to FIG. 3. As shown in FIG. 3, in this example, multiple objects (preceding vehicles) 100, 102 are traveling in tandem ahead of the subject vehicle 10, namely, in the direction of the millimeter-wave beam radiated by the radar 34a. In this case, the radar unit 34 detects the preceding vehicles 100, 102 and the ECU 40 stores them in memory as millimeter-wave targets, while the imaging unit 36 detects an object present in the vicinity of the preceding vehicle 102 and the ECU 40 stores it in memory as a camera target.

In this case, the position of the object detected by the imaging unit 36 and stored in memory as the camera target is very near the position of the preceding vehicle 102 detected by the radar unit 34 and stored as the millimeter-wave targets, so that by ordinary (conventional) control, the ECU 40 would determine the object detected by the imaging unit 36 to be the same thing as the preceding vehicle 102 among the objects detected by the radar unit 34.

However, it is inconceivable the imaging unit 36 would detect the preceding vehicle 102 (object other than the nearest object ahead) without detecting the preceding vehicle 100 that is the nearest object ahead. In other words, the object detected by the imaging unit 36 is actually the preceding vehicle 100. Therefore, this embodiment is configured to deal with such a situation by appropriately determining that the object detected by the imaging unit 36 is the same object as the preceding vehicle 100 (nearest object ahead) among the objects (preceding vehicles 100, 102) detected by the radar unit 34.

As stated above, the embodiment of this invention is configured to have an apparatus or method for detecting and determining identicality of at least one object (preceding vehicle 100, 102 and the like) present within a region around a subject vehicle (10) to be monitored, comprising: a first detector (radar unit) 34 adapted to detect the at least one object as a first object; a second detector (imaging unit) 36 adapted to detect the at least one object; and an identicality determiner (ECU) 40 (also referred to as an identity determiner) adapted to determine whether the at least one object detected by the first and second detectors are identical to each other so as to be the same object, wherein the identicality determiner determines that, when the first detector detects the objects in a plural number in a first direction (traveling direction of the subject vehicle 10; YES in S12) and the second detector detects the object in a single number in a second direction that is same as the first direction (traveling direction of the subject vehicle 10; YES in S16), one among the objects ahead and nearest to the subject vehicle detected by the first detector and the object detected by the second detector are identical (S34). Therefore, even in the case where one of the detector (radar unit 34) detects multiple objects in the traveling direction of the subject vehicle 10, identicality with an object detected by the other detector (imaging unit 36) can be accurately determined.

In other words, when the radar unit 34 detects multiple objects in the traveling direction of the subject vehicle 10, while the imaging unit 36 detects only a single object, the single object detected by the imaging unit 36 can be determined to be the nearest object ahead. Therefore, a configuration is adopted whereby in such a case the nearest object ahead detected by the radar unit 34 and an object detected by the imaging unit 36 are determined to be the same object.

In the apparatus or method, the identicality determiner determines that, when a position of the object detected by the second detector is nearer to a position of object other than the one than to a position of the one (NO in S20), the one and the object detected by the second detector are identical (S34). This is because, by the prior art, objects detected by the respective detectors whose distances are the same or detected objects whose distances are near one another are determined to be the same object. However, even in such a situation, when the other detector detects only one object, it is reasonable to conclude that the other detector has detected an object near the subject vehicle 10 (nearest object ahead). Therefore, a configuration is adopted whereby, even in a case where a comparison of detected object distances shows that the distance of another object is shorter than the distance of the object near the subject vehicle 10, the object detected by the imaging unit 36 is determined (corrected) to be the same object as the nearest object ahead. Therefore, in addition to realizing the foregoing effects, the identicality of an object detected by the radar unit 34 and the object detected by the imaging unit 36 can be determined still more accurately.

In the apparatus or method, the identicality determiner determines that, when the one is present within a predetermined range relative to the subject vehicle (YES in S24), the one and the object detected by the second detector are identical (S34). That is, a configuration is adopted whereby, insofar as the radar unit 34 can accurately detect at least the nearest object ahead, the nearest object ahead detected by the radar unit 34 and the object detected by the imaging unit 36 are determined to be the same object. Therefore, in addition to realizing the aforesaid effects, the identicality of an object detected by the radar unit 34 and the object detected by the imaging unit 36 can be determined still more accurately.

In the apparatus or method, the identicality determiner determines that, when a moving speed of the one relative to that of the subject vehicle is equal to or smaller than a predetermined value (upper limit value), the one and the object detected by the second detector are identical (S34). More exactly, the identicality determiner determines that the one and the object detected by the second detector are identical, when the relative speed is equal to or greater than a lower limit value and equal to or smaller than an upper limit value (predetermined value; YES in S28). Namely, a configuration is adopted whereby, insofar as the radar unit 34 can stably and continuously detect at least the nearest object ahead among the multiple objects detected thereby, the nearest object ahead detected by the radar unit 34 and the object detected by the imaging unit 36 are determined to be the same object. Therefore, in addition to realizing the aforesaid effects, the identicality of an object detected by the radar unit 34 and the object detected by the imaging unit 36 can be determined still more accurately.

In the apparatus or method, the identicality determiner determines that, when object other than the one (other object) is present within a prescribed range relative to a position of the one (YES in S32), the one and the object detected by the second detector are identical (S34). In other words, a configuration is adopted whereby, insofar the other object that is an object other than the nearest object ahead among the multiple objects detected by the radar unit 34 may be falsely detected by the imaging unit 36, the nearest object ahead detected by the radar unit 34 and the object detected by the imaging unit 36 are determined to be the same object. Therefore, in addition to realizing the aforesaid effects, the identicality of an object detected by the radar unit 34 and the object detected by the imaging unit 36 can be determined still more accurately.

In the apparatus or method, the identicality determiner determines that, when a speed difference among the objects detected by the first detector is equal to or smaller than a prescribed value (YES in S30), the one and the object detected by the second detector are identical (S34). That is, as in the foregoing, a configuration is adopted whereby insofar the other object that is an object other than the nearest object ahead among the multiple objects detected by the radar unit 34 may be falsely detected by the imaging unit 36, the nearest object ahead detected by the radar unit 34 and the object detected by the imaging unit 36 are determined to be the same object. Therefore, in addition to realizing the aforesaid effects, the identicality of an object detected by the radar unit 34 and the object detected by the imaging unit 36 can be determined still more accurately.

In the apparatus or method, the identicality determiner determines that the one and the object detected by the second detector are identical (S34), when a distance between the one and the object detected by the second detector is equal to or smaller than a predetermined distance that is set to be increased with increasing distance between the subject vehicle and the one or with increasing distance between the subject vehicle and the object detected by the second detector (S18; YES in S22). To explain, when the distance from the subject vehicle 10 to the object is short, the risk of the object being falsely detected by the imaging unit 36 is small, but when the distance from the subject vehicle 10 to the object is great, the risk of the object being falsely detected by the imaging unit 36 increases. So in this embodiment, the predetermined distance as a criterion for determining identicality is varied in accordance with the distance from the subject vehicle 10 and the detected vehicle. Therefore, in addition to realizing the aforesaid effects, the identicality of an object detected by the radar unit 34 and the object detected by the imaging unit 36 can be determined still more accurately.

In the apparatus or method, the first detector detects the at least one object cyclically and the identicality determiner determines that the one and the object detected by the second detector are identical (S34), when the first detector continuously detects the one a predetermined number of times (YES in S26). Therefore, in addition to realizing the aforesaid effects, it becomes possible to exclude the case where the radar unit 34 has falsely detected the object concerned, so that the identicality of an object detected by the radar unit 34 and the object detected by the imaging unit 36 can be determined still more accurately.

In the apparatus or method, the first detector comprises a radar 34*a* and the second detector comprises a camera 36*a*. Therefore, even in the case of using the camera 36*a* of relatively low object detection accuracy in the traveling direction of the subject vehicle 10, the identicality of an object detected by the camera 36*a* and an object detected by the radar 34*a* can be determined accurately.

In the apparatus or method, the region around the subject vehicle to be monitored is a region surrounding the subject vehicle when it travels on a road. Therefore, in addition to realizing the aforesaid effects, the identicality of an object detected on the road can be determined accurately.

Although the foregoing embodiment was explained indicating that the first detector is the radar unit 34 and that the presence of objects ahead of the subject vehicle 10 is discerned using a millimeter-wave beam, this is not a limitation, and the first detector can be one that recognizes the presence of objects ahead of the subject vehicle 10 using a laser beam, infrared beam or the like instead of the millimeter-wave beam.

Although the foregoing explanation takes the monocular camera 36*a* as an example of the imaging unit 36, this not a limitation and it is possible instead to recognize objects present ahead of the subject vehicle 10 using multiple cameras 36*a*. As this enables recognition of objects by triangulation, the accuracy of object recognition in the traveling direction of the subject vehicle 10 can be improved over that in the case of a monocular camera.

Although the foregoing embodiment was explained using the radar unit 34 and the imaging unit 36 as examples of the first and second detector, it is additionally possible to utilize data from third and fourth detector, such as data obtained from the navigation unit 44 and data obtained from infrastructural features, pedestrians and other sources via wireless communication means and the like.

Japanese Patent Application No. 2014-091994, filed on Apr. 25, 2014, is incorporated by reference herein in its entirety.

While the invention has thus been shown and described with reference to a specific embodiment, it should be noted that the invention is in no way limited to the details of the described arrangement; changes and modifications may be made without departing from the scope of the appended claims.

What is claimed is:

1. An apparatus for detecting and determining identity of an object present within a region around a subject vehicle to be monitored, said apparatus comprising:
   a first detector adapted to detect the object as a first object;
   a second detector adapted to detect the object; and
   an identity determiner adapted to determine whether the first object detected by the first detector and the object detected by the second detector are identical to each other so as to be the same object,
   wherein the identity determiner is further adapted to determine that, when the first detector detects a plurality of objects including the first object in a first direction, and the second detector detects only the first object in a second direction that is same as the first direction, a nearest object ahead of the subject vehicle, among the plurality of objects detected by the first detector, and the object detected by the second detector are identical to each other so as to be the same object.

2. The apparatus according to claim 1, wherein the identity determiner is further adapted to determine that, when a position of the object detected by the second detector is nearer to a position of an object, other than the first object, than to a position of the first object, the first object and the object detected by the second detector are identical to each other so as to be the same object.

3. The apparatus according to claim 1, wherein the identity determiner is further adapted to determine that, when the first object is present within a predetermined range relative to the subject vehicle, the first object and the object detected by the second detector are identical to each other so as to be the same object.

4. The apparatus according to claim 1, wherein the identity determiner is further adapted to determine that, when a moving speed of the nearest object ahead relative to that of the subject vehicle is equal to or smaller than a predetermined value, the nearest object ahead and the object detected by the second detector are identical to each other so as to be the same object.

5. The apparatus according to claim 1, wherein the identity determiner is further adapted to determine that, when an object other than the first object is present within a prescribed range relative to a position of the first object, the first object and the object detected by the second detector are identical to each other so as to be the same object.

6. The apparatus according to claim 1, wherein the identity determiner is further adapted to determine that, when a speed difference among the plurality of objects detected by the first detector is equal to or smaller than a prescribed value, the nearest object ahead and the object detected by the second detector are identical to each other so as to be the same object.

7. The apparatus according to claim 1, wherein the identity determiner is further adapted to determine that the nearest object ahead and the object detected by the second detector are identical to each other so as to be the same object, when a distance between the nearest object ahead and the object detected by the second detector is equal to or smaller than a predetermined distance that is set to be increased with increasing distance between the subject vehicle and the nearest object ahead or with increasing distance between the subject vehicle and the object detected by the second detector.

8. The apparatus according to claim 1, wherein the first detector detects the object cyclically and the identity determiner determines that the nearest object ahead and the object detected by the second detector are identical to each other so as to be the same object, when the first detector continuously detects the nearest object ahead a predetermined number of times.

9. The apparatus according to claim 1, wherein the first detector comprises a radar and the second detector comprises a camera.

10. The apparatus according to claim 1, wherein the region around the subject vehicle to be monitored is a region surrounding the subject vehicle when it travels on a road.

11. A method for detecting and determining identity of an object present within a region around a subject vehicle to be monitored having a first detector adapted to detect the object as a first object, a second detector adapted to detect the object, and an identity determiner adapted to determine whether the first object detected by the first detector and the object detected by the second detector are identical to each other so as to be the same object, said method comprising the step of:
   determining that, when the first detector detects a plurality of objects including the first object in a first direction and the second detector detects the first object in a second direction that is same as the first direction, a nearest object ahead of the subject vehicle among the plurality of objects detected by the first detector and the object detected by the second detector are identical to each other so as to be the same object.

12. The method according to claim 11, wherein the step of determining determines that, when a position of the object detected by the second detector is nearer to a position of object other than the first object than to a position of the first object, the first object and the object detected by the second detector are identical to each other so as to be the same object.

13. The method according to claim 11, wherein the step of determining determines that, when the nearest object ahead is present within a predetermined range relative to the subject vehicle, the nearest object ahead and the object detected by the second detector are identical to each other so as to be the same object.

14. The method according to claim 11, wherein the step of determining determines that, when a moving speed of the nearest object ahead relative to that of the subject vehicle is equal to or smaller than a predetermined value, the nearest object ahead and the object detected by the second detector are identical to each other so as to be the same object.

15. The method according to claim 11, wherein the step of determining determines that, when object other than the first object is present within a prescribed range relative to a position of the nearest object ahead, the nearest object ahead and the object detected by the second detector are identical to each other so as to be the same object.

16. The method according to claim 11, wherein the step of determining determines that, when a speed difference among the plurality of objects detected by the first detector is equal to or smaller than a prescribed value, the nearest object ahead and the object detected by the second detector are identical to each other so as to be the same object.

17. The method according to claim 11, wherein the step of determining determines that the nearest object ahead and the object detected by the second detector are identical to each other so as to be the same object, when a distance between the nearest object ahead and the object detected by the second detector is equal to or smaller than a predetermined distance that is set to be increased with increasing distance between the subject vehicle and the nearest object ahead or with increasing distance between the subject vehicle and the object detected by the second detector.

18. The method according to claim 11, wherein the first detector detects the object cyclically and the step of determining determines that the nearest object ahead and the object detected by the second detector are identical to each other so as to be the same object, when the first detector continuously detects the nearest object ahead a predetermined number of times.

19. The method according to claim 11, wherein the first detector comprises a radar and the second detector comprises a camera.

20. The method according to claim 11, wherein the region around the subject vehicle to be monitored is a region surrounding the subject vehicle when it travels on a road.

* * * * *